United States Patent [19]

Fasolino

[11] Patent Number: 4,880,031

[45] Date of Patent: Nov. 14, 1989

[54] HEATER AND AIR CONDITIONING CONTROL SYSTEM

[75] Inventor: Gabriel V. Fasolino, Portland, Oreg.

[73] Assignee: Sprague Aristo-Aire, Inc., Wilsonville, Oreg.

[21] Appl. No.: 186,918

[22] Filed: Apr. 27, 1988

[51] Int. Cl.⁴ ............................................. B60H 1/02
[52] U.S. Cl. .............................. 137/625.12; 91/536; 237/12.3 B; 165/33
[58] Field of Search ............................. 165/43, 33, 24; 98/2.06, 2.08, 2.05, 2.09; 236/51; 91/536; 237/12.3 B; 137/625.69, 625.12

[56] References Cited

U.S. PATENT DOCUMENTS

| 1,949,511 | 3/1934 | Flygare | 137/625.12 |
| 2,747,611 | 5/1956 | Hewitt | 137/625.69 |
| 2,749,707 | 6/1956 | Slomer | 91/536 X |
| 3,983,930 | 10/1976 | Franz | 237/12.3 B X |
| 4,427,056 | 1/1984 | Johnson et al. | 237/12.3 B X |

Primary Examiner—William E. Wayner
Attorney, Agent, or Firm—Eugene M. Eckelman

[57] ABSTRACT

A control head has support structure arranged to support it at the rear side of a dashboard. This control head supports a mode control lever and a valve having an elongated housing with pressure inlet and outlet laterals therein. The outlet laterals are arranged to communicate with remote fluid pressure operated structures, and the valve has a stem operated by the mode control lever for controlled operation of the inlet and outlet laterals upon pivoted movement of the lever to operate the remote fluid pressure operated structures. The structural arrangement of the control head facilitates use of quick connect and disconnect flexible tubing between the inlet and outlet laterals and with the fluid pressure operated structures. The control head also has a cam switch operated by the mode control lever for controlled operation of an air conditioning unit.

4 Claims, 3 Drawing Sheets 4,880,031

HEATER AND AIR CONDITIONING CONTROL SYSTEM

BACKGROUND OF THE INVENTION

This invention relates to new and useful improvements in heater and air conditioning control systems, and as one embodiment thereof is illustrated as climate control for the driver's compartment of vehicles.

Trucks and other vehicles have various means for controlling the functions of climate control for the driver's compartment. For example, such means may employ manually operable push-pull cables. Power means, such as shown in U.S. Pat. No. 4,466,456, have also been proposed but such means have employed complicated fittings and numerous seals and valve parts, making them bulky for mountin small spaces as well as cumbersome and costly to install.

SUMMARY OF THE INVENTION

It is an object of the present invention to provide an improved heater and air conditioning control system for the driver's compartment of vehicles utilizing compact compressed air drive means and employing a novel control lever and valve assembly for operating said drive means.

Another object of the invention is to provide a control lever and valve assembly for the purpose described having a structural arrangement that makes it readily adaptable for installation in existing control panels of vehicles.

Still another object of the invention is to provide a heater and air conditioning control system of the type described which is simplified in structure, simplified to install and maintain, and reliable in operation.

In carrying out the objects of the invention, the embodiment illustrated comprises a control lever and valve assembly employing a manually operable lever pivotally supported between its ends on a support member. The lever has selected control positions and is associated with a valve on the support member having an elongated housing including a cylinder area therein. A stem in the valve housing includes at least one piston head in the cylinder area and the stem has one projecting end which is connected to the lever. The valve housing is integrated with the support member in a plane parallel with the plane of the housing and the lever to utilize a minimum of space. The stem is connected to one end of the lever and carries one element of switching mechanism which cooperates upon movement of the stem with another switching element to control operation of an air conditioning unit. The valve has an inlet lateral adjacent one end thereof and a plurality of outlet laterals leading into a cylinder area thereof. The outlet laterals communicate by means of flexible hoses to remote fluid operated means operably connected to directional control doors. The directional doors form a part of an air distributing housing with fresh air and recirculating air inlets, a heater and air conditioning inlet, and various outlets for directing heated or cooled air to the driver's compartment.

The invention will be better understood and additional objects and advantages will become apparent from the following description taken in connection with the accompanying drawings.

DETAILED DESCRIPTION OF A PREFERRED EMBODIMENT

The present control lever and valve assembly is particularly adapted and is illustrated herein for operating climate control systems of vehicles and especially trucks. It is to be understood however that such control lever and valve assembly can be utilized for purposes other than for vehicle climate control systems, namely, any purpose in which the operation of fluid operated means is to be controlled.

Figure 1:
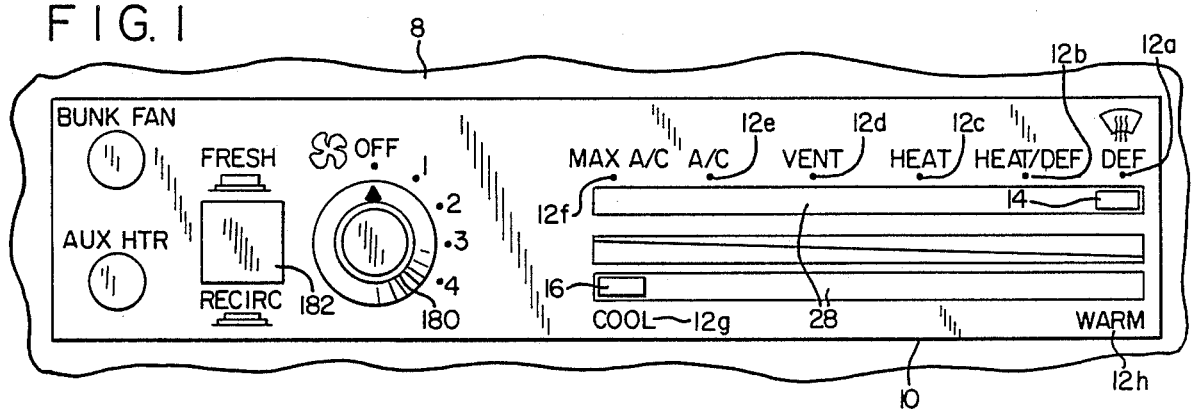
FIG. 1 is a face view of a control panel of a type commonly used on a vehicle dashboard.
Figure 5:
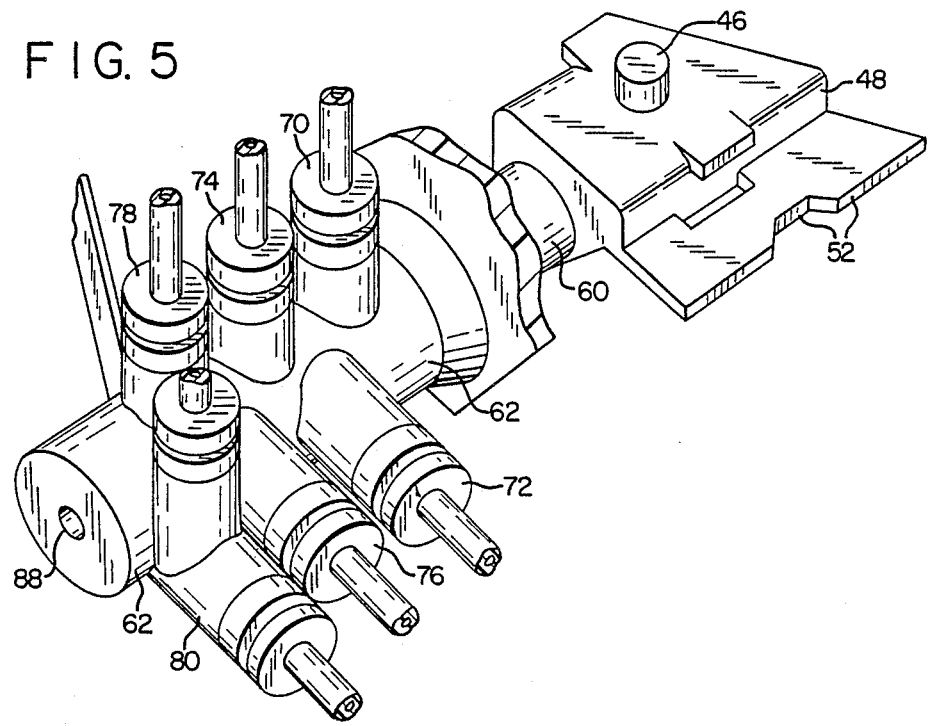
FIG. 5 is a perspective view of the valve portion of the control lever and valve assembly, this view being taken from the underside of the assembly.

The numeral 8, FIG. 1, designates a dashboard of a truck or other vehicle, and the numeral 10 designates a climate control panel of the usual type arranged to be removably supported in the dashboard and having various climate mode designations 12a, 12b, 12c, 12d, 12e and 12f. This panel also has temperature designations 12g and 12h of climate control thereon. The numeral 14 designates a mode control lever associated with mode designations 12a–12f and the numeral 16 designates a temperature adjust lever associated with modes 12g and 12h.

Figure 2:
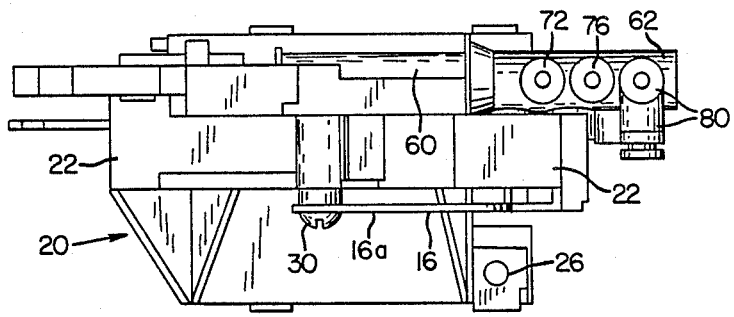
FIG. 2 is a rear elevational view of a control lever and valve assembly which forms a part of the invention and which is arranged for mounting behind the vehicle dashboard at the control panel, this view being taken on line 2—2 of FIG. 3.
Figure 3:
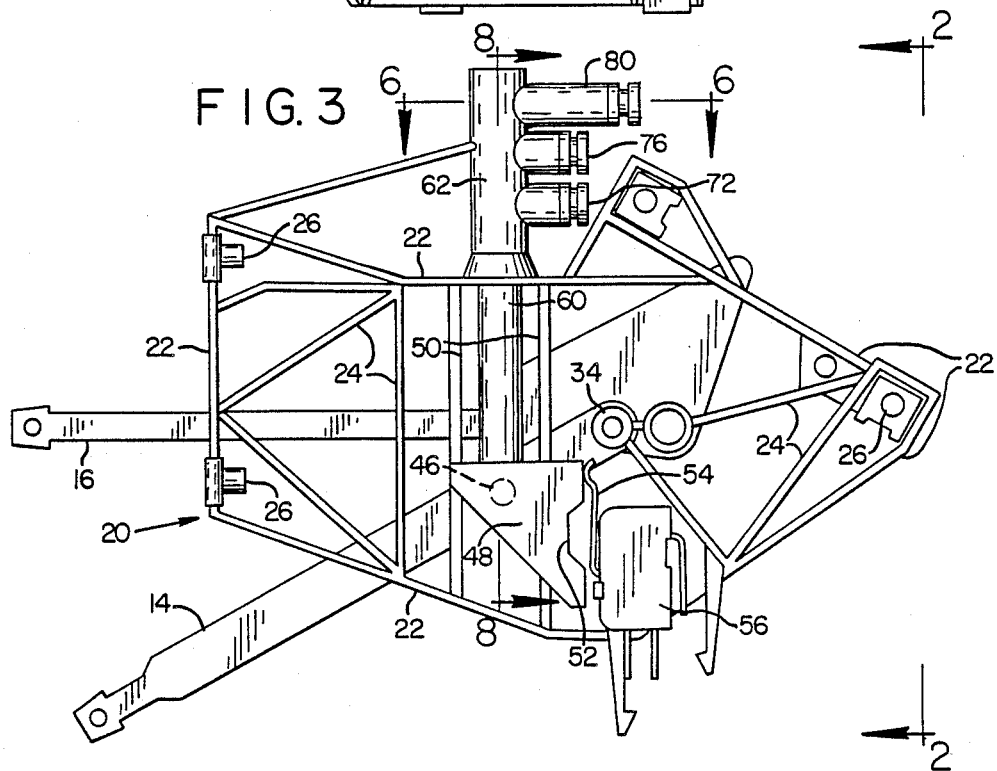
FIG. 3 is a top plan view of the control lever and valve assembly.
Figure 4:
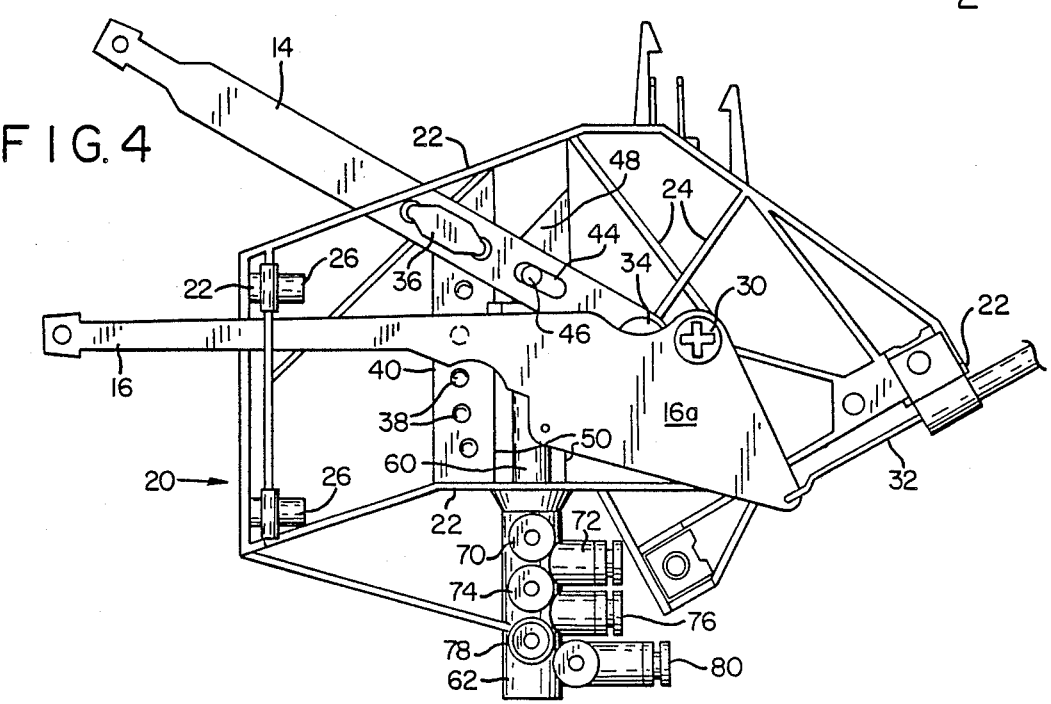
FIG. 4 is a bottom plan view of the control lever and valve assembly.

With reference to FIGS. 2, 3 and 4, the control lever and valve assembly of the invention comprises a control head 20 constructed in an open top and bottom structure, such as by molding, to include defining outer contoured front, rear and side wall portions 22 and reinforcing internal and external struts 24. The body member of this control head has suitable screw sockets 26 for removable securement to the rear side of the dashboard of a vehicle and/or suitable bracket means, not shown, on the dashboard. In the mounted position of the control head on the dashboard, the mode control and temperature adjust levers project through suitable slots 28 in the climate control panel for adjustment by the operator as desired.

Temperature adjust lever 16 extends parallel with the overall longitudinal plane of the body member and is pivotally attached adjacent its rearward end to a pivot pin 30, FIG. 4, integral with struts 24 of the control head. This lever has lateral pivotal movement in its parallel relation with the body member and includes a lateral lever extension 16a which is connected to and arranged to drive a flexible cable or lever 32 extending to variable heat supply means of the vehicle.

Mode control lever 14 also extends parallel with the overall longitudinal plane of the control head and has pivot support at its rearward end on a pivot pin 34, FIGS. 3 and 4, immediately forward of pivot support 30 for the temperature adjust lever 16. Pivot 34 supports the lever 14 for pivotal movement parallel with the body member, and selected friction held position of this lever, as shown by the designations 12a–12f in FIG. 1, are provided by a spring detent 36 projecting through a portion of the lever and engageable in depressions 38 selectively positioned arcuately on a cross bar 40 integral with the body member for holding the lever at the various mode positions.

Figure 8:
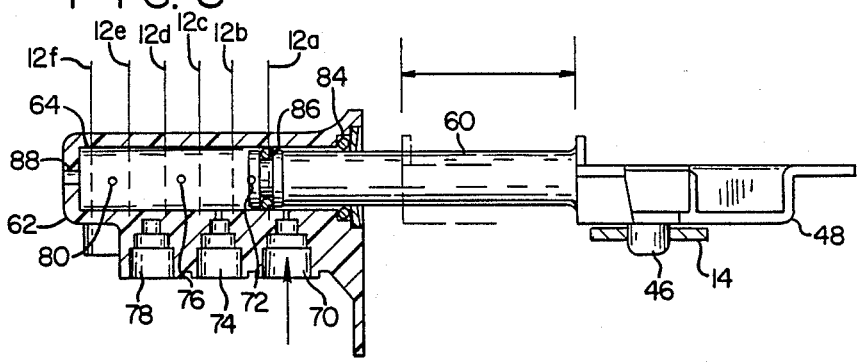
FIG. 8 is a fragmentary sectional view of a valve assembly taken on the line 8—8 of FIG. 3 and showing functioning positions for the valve portion diagrammatically.
Figure 9:
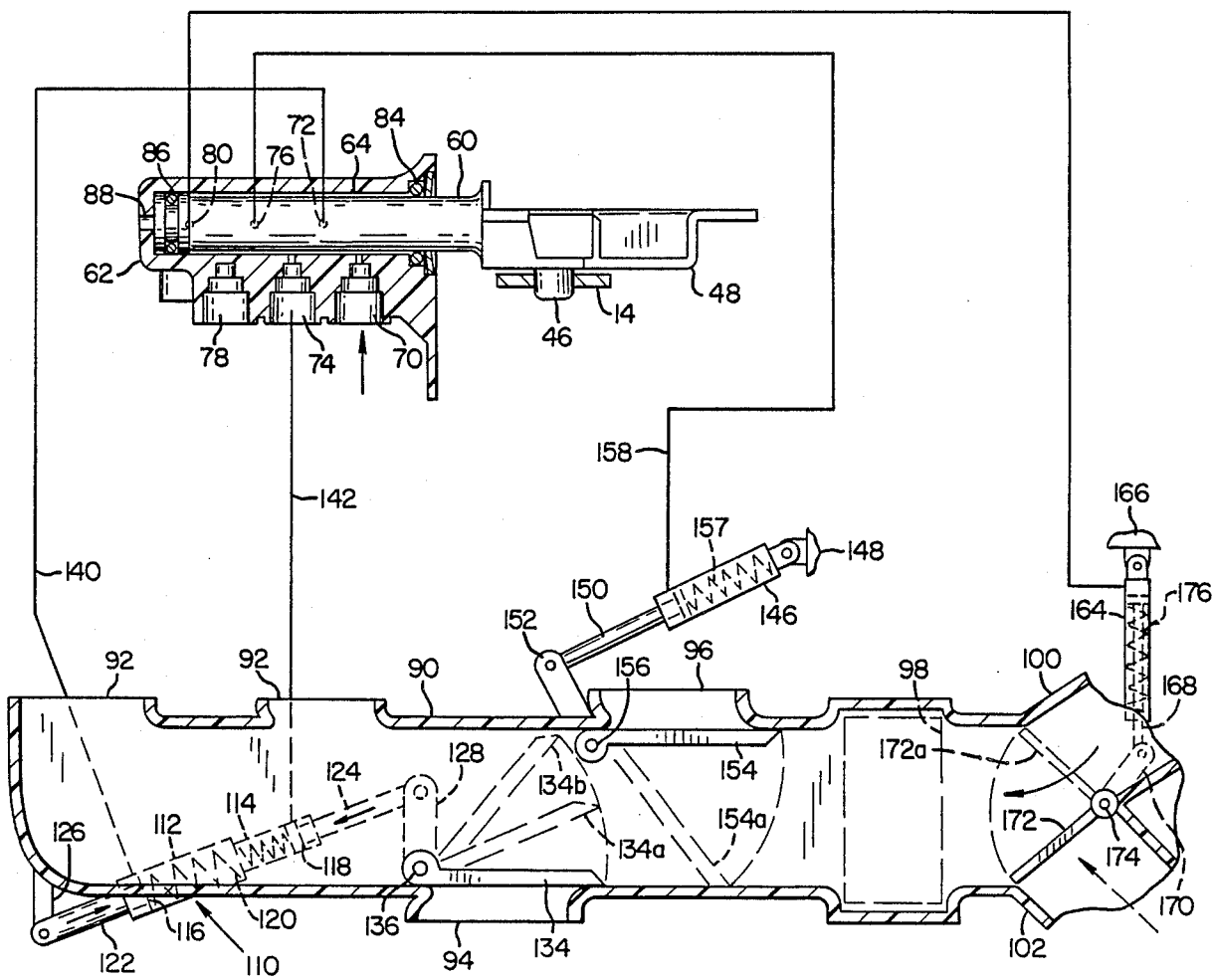
FIG. 9 is a view similar to FIG. 8 but showing diagrammatically operative connections of valve outlets to fluid operated means on an air distributing housing.

Lever 14 has a longitudinal slot 44 intermediate its pivot support and the spring detent 36 which freely receives in a lateral driving connection a depending projection 46, also seen in FIGS. 8 and 9, of a switch actuating cam member 48 slidably supported laterally on cross rails 50 integral with the control head 20. Slot 44 is elongated to accommodate the combined arcuate and straight line movement of the slot holes and the projection 46. Cam member 48 has a cam face 52 with ridges and valleys which selectively operate the lever arm 54 of a microswitch 56 mounted suitably on the body member 20. Cam face 52 is shaped such that upon movement of the lever to selected positions, circuitry through switch 56 is established for an air conditioning unit on the vehicle. The switch is closed in mode designations 12a and 12b of the lever 14 as well as in positions 12e and 12f to energize the air conditioning unit by electrical circuitry, not shown. The switch is open in modes 12c and 12d to the air conditioning unit and such unit is deenergized in these positions.

Secured to the switch actuating cam member 48 and movable laterally with it and the lever 14 in straight line movement is the stem 60 of a valve housing 62, FIGS. 3–5, 8 and 9. This valve housing has an inner cylinder area 64 with an inlet or supply 70 connected to a source of pressured air, not shown. The valve housing has a plurality of outlet laterals 72, 74, 76, 78 and 80 communicating with the cylinder area 64 and capable of having suitable conduit communication with fluid operated means which operate control doors, baffles, or the like, to be described of the vehicle climate control system.

Figure 6:
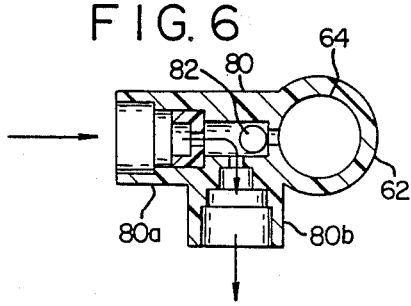
FIGS. 6 and 7 are sectional views showing ball check means forming a part of the valve, these views being taken on the line 6—6 of FIG. 3.
Figure 7:
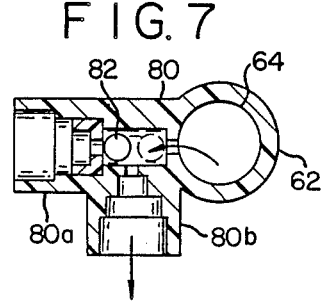

Outlet laterals 72, 74, 76 and 78 comprise single fitting outlets but lateral 80 has a dual fitting with openings 80a and 80b, FIGS. 6 and 7, and a ball check valve 82 therein. This valve controls selected movement of air through the openings 80a and 80b relative to each other and relative to cylinder area 64, as will be more apparent hereinafter.

Inner cylinder area 64 is open at one end and slidably receives the stem 60 through a seal 84, FIGS. 8 and 9, at this opening. Stem 60 is smaller in diameter than the cylinder area 64 and has an end O-ring seal 86 cooperating with the cylinder area 64 to provide selected communication of outlet laterals 72, 74, 76, 78 and 80 with the supply inlet lateral 70. FIGS. 8 and 9 show opposite end travel limits of the stem resulting from movement of the mode control lever 14, FIG. 8 showing a first position of the lever 14 wherein air pressure from supply inlet lateral 70 is closed off from all the outlet laterals. As the stem is moved to the left toward its FIG. 9 position, the outlet laterals 72, 74, 76 and 80 are exposed progressively to pressure from the inlet lateral 70. Outlet lateral 78 is plugged and is included as a spare outlet which can be opened in the event there is a need for it. Valve housing 62 has an end port 88 to atmosphere for allowing free movement of the stem and for exhausting air from operating cylinders, to be described.

As stated hereinbefore the valve 62 when operated by the mode control lever 14 controls functioning of air operated cylinders in the climate control system of the vehicle. FIG. 9 shows such a system with parts thereof being represented diagrammatically. The numeral 90 in this figure designates an air distributing housing with which the present system has particular use. This housing from left to right in FIG. 9 has defrost outlets 92 for defrosting the windshield, a heat outlet 94 for supplying heat to a floor area, a vent outlet 96 for supplying heat or air conditioning through the dashboard, an inlet for a heater and air conditioning unit 98, an outside air inlet 100, and a recirculating inlet 102. Conduits connecting this housing to various points in the vehicle are not shown since such are conventional.

Air flow to the defrost outlets 92 and heat outlet 94 is controlled under the influence of valve 62 by a three position piston cylinder assembly 110 having a pair of cylinders 112 and 114. Pistons 116 and 118 in the cylinders 112 and 114 respectively are normally held apart by a compression spring 120 with their respective piston rods 122 and 124 projecting from opposite ends of the assembly. Piston rod 122 has a pivoted anchor connection to a bracket 126 and piston rod 124 has pivot connection to a lever arm 128 on a heat outlet door 134 having a hinged connection 136 to the housing at its end closest to the cylinder assembly. The spring 120 in cylinder 110 holds the pistons in retracted position and the door shut when not acted upon by the cylinder assembly 110. A flexible conduit 140 leads from the outer end of cylinder 112 and a flexible conduit 142 leads from the outer end of cylinder 114. These conduits lead from the outlet laterals 72 and 74 of the valve 62 respectively. The structure of cylinder assembly 110 is such that when only the piston 116 in the cylinder 112 is acted upon by air pressure, the entire cylinder assembly slides on the anchored piston 116, namely, to the left in FIG. 9, and pulls the door to a partially open position as designated by the numeral 134a. When both pistons are acted upon by air pressure, the piston 118 will travel inwardly of its cylinder wherein the door 134 will be pulled to a fully open position designated by the numeral 134b. This position of the door shuts off flow from inlets 100 or 102 to the defrost outlet. A piston cylinder assembly 146 is anchored pivotally at one end by suitable means 148 to the vehicle and its piston rod 150 projects from the opposite end for pivotal connection to the lever arm 152 of a door 154 having a hinged connection 156 to the housing. A spring 157 in cylinder 146 normally holds the piston extended and the door 154 shut. A flexible conduit 158 leads from the piston rod end of cylinder assembly 146 to the outlet lateral 76 of valve 62 and when this cylinder assembly is activated, the door is opened fully to the position designated by the numeral 154a. This open position shuts off flow from inlets 100 or 102 to the heat and defrost openings 92 and 94 and allows flow to the openings 96.

A piston cylinder assembly 164 is anchored pivotally at one of its ends to the vehicle by suitable means 166 and its piston rod 168 projects from the opposite end and is pivotally connected to the lever arm 170 of a door 172 having a hinged connection 174 to the housing 90. This door is normally held closed and the piston retracted in cylinder 164 by a spring 176. This door normally closes off recirculating inlet 102 to the housing 90 and allows free movement of outside air through outside air inlet 100. When cylinder assembly 164 is activated, the door 172 closes off the inlet of outside air and opens the recirculating air inlet, as shown by door position 172a, whereby air inside the vehicle will be recirculated. This cylinder is in communication with opening 80b of the double outlet opening 80.

Also associated with the climate control panel 10, FIG. 1, is a fan control switch 180 to regulate the volume of air flow from the heater and air conditioning unit 98. Such panel also includes a push button control switch 182 which comprises a suitable and well-known push button valve, not shown, alternately providing on-off flow of pressured air from the vehicle source of pressure to opening 80a of dual outlet 80.

OPERATION

In the various modes of the lever 14, the amount of heat is controlled by the lever 16 and fan speed control switch 180. With the lever 14 on the defrost mode 12a, seal 86 of the valve stem 60 closes off pressure supply 70 to all outlet laterals, FIG. 8, the phantom line mode designations 12a–12f in this Figure comprising the position of the end seal 86 at the similarly designated mode positions of the lever 14 in FIG. 1. With reference to FIG. 9, incoming air through either inlet 100 or 102 of air distributing housing 90 is directed through defrost outlets 92 in the defrost mode 12a since the doors 134 and 154 are in their normally closed position at this time. With the control switch 182 set on fresh air there is no pressure to cylinder 164 and fresh air is available through inlet 100 of housing 90 to defrost. The volume of flow of air in this mode can be controlled by fan control switch 180. If it is desired to recirculate air in the defrost mode, the control switch 182 is depressed to direct pressured air to the inlet 80a of dual fitting 80 and out opening 80b to activate cylinder assembly 164 and to move door 172 to its recirculating position 172a. Ball check valve 82 prevents escape of pressured air into cylinder area 64 of valve 62 and consequent exhaust through port 88. In the defrost mode the ridged portion of cam member 48 holds the switch 56 closed and the air conditioning unit is energized. Output of the air conditioning unit can be overcome by the inlet of heat as controlled by lever 16 if desired. Having the air conditioning unit on at this time is desirable since such units dehumidify the air.

Movement of mode control lever 14 to the next mode 12b, namely, to heat/defrost, seal 86 of valve stem 60 allows pressured air to flow from inlet lateral 70 to outlet lateral 72 which communicates with the cylinder 112 to cause the latter to pull down on its piston rod 122 for opening the door 134 to its intermediate position 134a, thus allowing air flow from one of the inlets 100 or 102 to flow partly to the heat outlet 94 and partly to the defrost outlet 92. The door 154 remains closed at this time. The use of fresh outside air or recirculated air can be controlled the same as described in connection with the defrost mode. The ridged portion of cam member 48 also holds the switch 56 closed in this mode for energization of the air conditioning unit.

Movement of the mode control lever 14 to the heat mode 12c allows pressured air to continue to cylinder 116 and also to flow to the cylinder 114 through outlet lateral 74. This forces the piston 118 and rod 124 in cylinder 114 inwardly to further pull door 134 open and thus swing it to its position 134b which closes off the defrost outlet 92. Vent 154 still remains shut and all the air flow is now through the heat outlet 94. In the heat mode a valley portion of the cam member 48 reaches the switch arm 54 and the switch 56 opens to shut off the air conditioning unit. Movement of lever 14 to the vent mode 12d maintains pressure in outlet laterals 72 and 74 and also opens outlet lateral 76 to pressure for activating cylinder 146. This opens vent 154 to its position 154a to open vent outlet 96 and direct all incoming air out throught the vent. Fresh or recirculated air can be used as in the former modes under control of switch 182 and the volume of flow controlled by switch 180. The valley portion of cam member 48 also allows the air conditioning unit switch to open in this mode. Movement of the control lever 14 to the air conditioning mode 12e turns on the air conditioning unit by closing the air conditioning switch 56. In the illustration of FIG. 8 this mode will allow pressured air to reach outlet lateral 78. However this outlet lateral is plugged but can be bored for an additional climate function if needed. This outlet could be located elsewhere in the valve if not compatible with the air conditioning mode.

Movement of the control lever 14 to maximum air conditioning mode 12f exposes outlet lateral 80 in valve 62 to pressure from inlet lateral 70. This pressure activates piston cylinder assembly 164 to move door 172 of air distributing housing 90 to its position 172a and cause recirculation of air in the vehicle. Ball check valve 82 seats as in FIG. 7 to prevent bleeding of air pressure back through opening 80a and out the exhaust port of the dash board switch 182.

In accordance with the invention, an improved heater and air conditioning control system is provided for vehicles. Such is accomplished by use of the particular construction of the control head 20 in its support of the mode control lever 14 and temperature adjusting lever 16, the air conditioning control switch 56 and its operation by the cam member 48, the compact and operating support thereon and operation of the valve 62, and the mounting means 26 capable of supporting it on the rear side of a dashboard. The structural arrangement allows the use of flexible tubing for quick connect and disconnect and for minimum expense and the use of minimum space, and furthermore allows the use of simple activating means 110, 146 and 164 for the various doors of an air distributing housing 90.

It is to be understood that the form of my invention herein shown and described is to be taken as a preferred example of the same and that various changes in the shape, size and arrangement of parts may be resorted to without departing from the spirit of my invention, or the scope of the subjoined claims. For example, the concept of the invention can, with slight alteration of the structure, be used with vacuum power, or hydraulic power.

Having thus described my invention, I claim:

1. A heater and air conditioning control system for accomplishing multiple modes of operation of climate control means through the medium of compressed fluid and remote fluid pressure operated means, said control system comprising:

a control head comprising a body member having front and rearward ends and top and bottom portions, mode control adjustment means on said body member movable between selected control positions, a valve housing secured in a stationary position on said body member and having opposite ends and a cylinder area therein, a first of said opposite ends of said housing facing said mode control adjustment means and having an opening communicating with said cylinder area, stem means having an outer end secured to said mode control adjustment means and an inner end projecting through said opening and into said cylinder area, a fluid pressure inlet communicating with said cylinder area, a plurality of fluid pressure outlets all spaced along said cylinder area on the side of said fluid pressure inlet opposite from said end opening.

said fluid pressure outlets communicating with respective remote fluid pressure operated means, and seal means consisting exclusively of a first seal at said opening to provide sealed sliding engagement of said stem means through said opening and a second seal on the inner end of said stem operating upon inward movement thereof by said mode control adjustment means to establish communication selectively between said fluid pressure inlet and one or more fluid pressure outlets.

2. The heater and air conditioning control system of claim 1 wherein said seals comprise 0-ring seals.

3. The heater and air conditioning control system of claim 1 including an exhaust port to atmosphere at the end of said housing opposite from the end having said opening therein.

4. A heater and air conditioning control system for accomplishing multiple modes of operation of climate control means through the medium of compressed fluid and remote fluid pressure operated means, said control system comprising:

a control head comprising a body member having front and rearward ends and top and bottom portions, mode control adjustment means on said body member movable between selected control positions, a valve housing secured in a stationary position on said body member and having opposite ends and a cylinder area therein, a first of said opposite ends of said housing facing said mode control adjustment means and having an opening communicating with said cylinder area, stem means having an outer end secured to said mode control adjustment means and an inner end projecting through said opening and into said cylinder area, seal means at said opening providing sealed sliding engagement of said stem means through said opening, a fluid pressure inlet communicating with said cylinder area, a plurality of fluid pressure outlets all spaced along said cylinder area on the side of said fluid pressure inlet opposite from said end opening, said fluid pressure outlets communicating with respective remote fluid pressure operated means, and seal means provided on the inner end of said stem operating upon inward movement thereof by said mode control adjustment means to establish communication selectively between said fluid pressure inlet and one or more fluid pressure outlets.

* * * * *